(12) United States Patent
Corbett et al.

(10) Patent No.: US 8,851,762 B2
(45) Date of Patent: Oct. 7, 2014

(54) THRUST BEARING AND SUSPENSION FOR VEHICLE

(75) Inventors: Richard Corbett, Fondettes (FR); Christophe Houdayer, Semblancay (FR); Samuel Viault, Saint Antoine du Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/515,348

(22) PCT Filed: Dec. 14, 2010

(86) PCT No.: PCT/EP2010/069655
§ 371 (c)(1),
(2), (4) Date: Aug. 24, 2012

(87) PCT Pub. No.: WO2011/076622
PCT Pub. Date: Jun. 30, 2011

(65) Prior Publication Data
US 2012/0321238 A1    Dec. 20, 2012

(30) Foreign Application Priority Data
Dec. 23, 2009 (FR) ..................... 09 59536

(51) Int. Cl.
*F16C 19/10* (2006.01)
*F16C 27/08* (2006.01)
*B60G 15/06* (2006.01)
*F16C 27/06* (2006.01)

(52) U.S. Cl.
CPC .............. *B60G 15/068* (2013.01); *F16C 27/08* (2013.01); *B60G 2204/418* (2013.01); *F16C 27/066* (2013.01)

USPC ......................................................... 384/609

(58) Field of Classification Search
CPC .... F16C 19/10; F16C 35/042; F16C 2326/05; B60G 15/067; B60G 15/068; B60G 2204/418
USPC ......... 384/490, 510, 526, 536, 590, 592, 609, 384/611, 613; 280/124.125, 280/124.145–124.147, 124.154, 124.155
See application file for complete search history.

(56) References Cited

U.S. PATENT DOCUMENTS 4,699,530 A * 10/1987 Satoh et al. ................... 384/609
6,558,043 B2   5/2003 Beghini et al.

(Continued)

FOREIGN PATENT DOCUMENTS

FR    2811264 A1    1/2002
FR    2857906 A1    1/2005

(Continued)

*Primary Examiner* — James Pilkington
(74) *Attorney, Agent, or Firm* — Bryan Peckjian; SKF USA Inc. Patent Department

(57) ABSTRACT

The suspension thrust bearing device for a motor vehicle comprises a rolling bearing (22) forming a thrust and provided with an upper ring, a lower ring, and at least one row of rolling elements placed between the rings, a bearing cap (18) in contact with the upper ring, and a supporting cap (20) in contact with the lower ring and forming a bearing means for a suspension spring (12). At least one of the said caps comprises a body formed of at least a first synthetic material and an insert (34) at least partly covered by the said body. The said insert is formed of at least a second synthetic material different from the first synthetic material.

7 Claims, 4 Drawing Sheets

(56) References Cited

U.S. PATENT DOCUMENTS

| | | | |
|---|---|---|---|
| 6,948,728 B2 * | 9/2005 | Pflugner et al. | 384/607 |
| 2005/0247531 A1 * | 11/2005 | Oota | 280/124.146 |
| 2011/0101584 A1 | 5/2011 | Viault et al. | |

FOREIGN PATENT DOCUMENTS

| | | | |
|---|---|---|---|
| FR | 2928187 A1 | | 9/2009 |
| WO | WO2009030842 A1 | | 3/2009 |
| WO | WO2009/106469 | * | 9/2009 |

* cited by examiner

THRUST BEARING AND SUSPENSION FOR VEHICLE

CROSS-REFERENCE

This application is the US national stage of International Application No. PCT/EP2010/069655 filed on Dec. 14, 2010, which claims priority to French Application No. FR 0959536 filed Dec. 23, 2009.

FIELD OF THE INVENTION

The present invention relates to the field of suspension thrust bearing devices used in particular in motor vehicles in the suspension struts of the steered wheels.

BACKGROUND OF THE INVENTION

Such a suspension thrust bearing device usually comprises a rolling bearing forming an axial thrust and comprising an upper ring and a lower ring between which a plurality of rolling elements are placed, for example balls or rollers. Preferably, a rolling bearing with oblique contact is used making it possible to absorb both the radial forces and the axial forces exerted on the device. The upper and lower rings are usually mounted in contact with upper and lower bearing or support parts such as dishes or caps. The upper and lower caps form a housing for the rings of the rolling bearing and make it possible to provide the interface between the said rings and the adjacent elements.

Such a suspension thrust bearing device is placed in the upper portion of a MacPherson strut between the body of the vehicle and a suspension spring. The spring is usually installed around a damper piston rod the end of which is connected to the body of the vehicle by means of an elastic block filtering the vibrations. The suspension spring, usually a helical spring, rests axially directly or indirectly on the lower bearing cap of the suspension thrust bearing device. For its part, the upper bearing cap is fixed relative to the body of the vehicle.

Such a suspension thrust bearing device makes it possible to transmit axial forces between the suspension spring and the body of the vehicle while allowing a rotary movement between the lower bearing cap and the filtering elastic block resulting from a turning of the steered wheels of the vehicle and/or from the compression of the suspension spring.

Patent applications FR-A1-2 811 264, FR-A1-2 857 906 and WO-A1-2009/030842 describe such suspension thrust bearing devices comprising a lower supporting cap and a rolling bearing mounted so as to rest against it. The lower supporting cap is made of synthetic material and comprises a metal reinforcing framework or insert improving the mechanical strength of the cap against the forces exerted by the suspension spring.

Since the reinforcing insert is made of metal, it is necessary to sink it fully inside the lower supporting cap in order to avoid having recourse to anti-corrosion surface treatments such as electrophoresis. Specifically, these treatments are quite costly and using them causes pollution.

Moreover, the method for manufacturing such a cap is relatively protracted and complex because the reinforcing insert has to be formed first by cutting and swaging a metal sheet blank and then the synthetic material of the cap has to be overmoulded onto the insert thus formed. Moreover, the insert increases the overall weight of the lower supporting cap and more generally that of the suspension thrust bearing device.

The object of the present invention is to remedy these drawbacks.

SUMMARY OF THE INVENTION

More particularly, the object of the present invention is to provide an economic suspension thrust bearing device of simple design that is easy to manufacture and is lightweight.

In one embodiment, a suspension thrust bearing device for a motor vehicle comprises a rolling bearing forming a thrust and provided with an upper ring, a lower ring, and at least one row of rolling elements placed between the rings, a bearing cap in contact with the upper ring, and a supporting cap in contact with the lower ring and forming a bearing means for a suspension spring. At least one of the said caps comprises a body formed of at least a first synthetic material and an insert at least partly covered by the body. The insert is formed of at least a second synthetic material different from the first synthetic material. The body of the cap and the insert forming the framework of the said body are moulded onto one another in synthetic materials of different types.

Producing the insert in synthetic material makes it possible to have great flexibility in its production and makes it easy to vary its thickness if necessary. Moreover, it lightens the weight of the cap relative to a cap comprising a metal reinforcing insert. Moreover, the manufacture of such a cap is simplified and relatively fast. After use, the cap can also be recycled more easily.

In one embodiment, the synthetic material of the insert is rigid and the synthetic material of the body is more flexible. The insert thus forms a reinforcing or stiffening insert or framework making it possible to reinforce the mechanical strength of the cap against the forces exerted by the suspension spring. It is possible to provide the insert with zones of variable thickness depending on the intensity of the forces to be withstood.

Alternatively, the synthetic material of the insert is flexible and the synthetic material of the body is more rigid. In this case, the synthetic material of the body makes it possible to withstand and transmit the forces exerted by the suspension spring, the insert made of a more flexible and cheaper material making it possible to reduce the overall cost of the cap. The insert forms a filler framework for the body of the cap so as to obtain a low-cost cap.

In this situation, the body of the said cap may comprise stiffening ribs for reinforcing the mechanical strength of the cap against the forces exerted by the suspension spring, the insert comprising recesses of matching shape inside which the said ribs at least partly extend.

The insert may be completely embedded into the body of the said cap. Alternatively, the insert may be partially embedded into the said body.

Preferably, the insert comprises an annular radial portion. The insert may also comprise an axial portion axially extending an inner edge of the radial portion.

In one embodiment, the supporting cap comprises the insert. Alternatively, or in combination, the bearing cap may also comprise an insert.

According to another aspect, a MacPherson strut is also proposed comprising a damper and a suspension thrust bearing device as described above.

BRIEF DESCRIPTION OF THE DRAWINGS

The present invention will be better understood on studying the detailed description of embodiments taken as non-limiting examples and illustrated by the appended drawings in which.

DETAILED DESCRIPTION OF THE PREFERRED EMBODIMENTS

Figure 1:
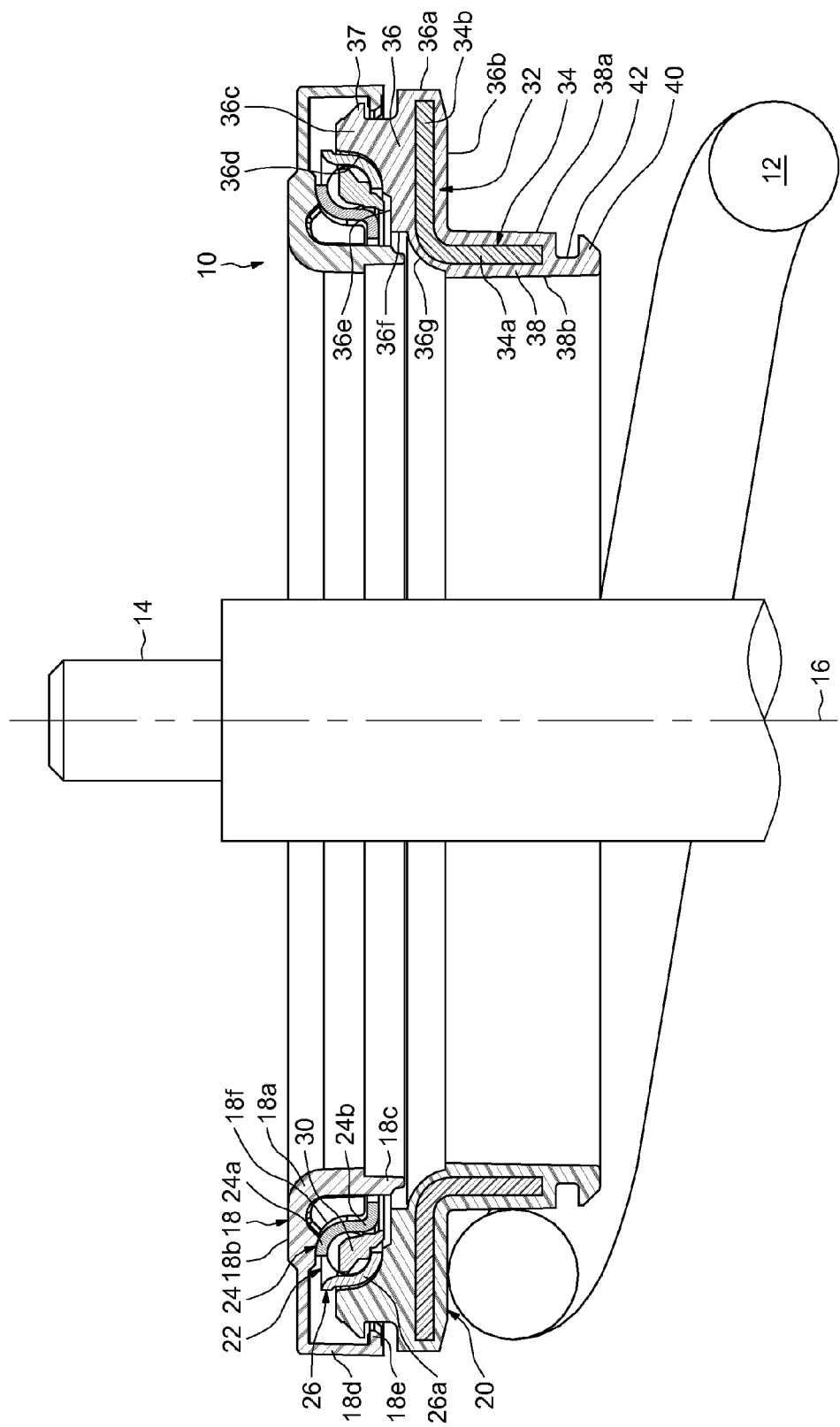
FIGS. 1 to 4 are views in axial section of suspension thrust bearing devices according to first, second, third and fourth embodiments of the invention.

FIG. 1 shows a suspension thrust bearing device, indicated by the general reference number 10, designed to be mounted between an element of the chassis of a motor vehicle and a suspension spring 12 of the helical type. The device 10 is placed around a damper rod 14, the axis 16 of which is considered to be vertical, the said rod being axially elongate in the form of a cylinder of revolution. The suspension spring 12 is mounted around the damper rod 14.

The device 10, with its axis 16, comprises an upper bearing cap 18 designed to rest against a filtering elastic block interposed between the device and the chassis of the vehicle, a lower supporting cap 20 forming a bearing means for the suspension spring 12, and a rolling bearing 22 placed axially between the said caps and forming an axial thrust.

The bearing cap 18 may consist in a one-piece body made by moulding of a synthetic material, for example a polyamide. It comprises an annular solid portion 18a the upper radial surface 18b of which is designed to come into contact with the filtering elastic block. The bearing cap 18 also comprises an inner annular axial skirt 18c that is thin and placed substantially in the extension of the bore of the solid portion 18a and extends axially downwards.

The bearing cap 18 also comprises a thin outer annular axial skirt 18d connecting to the upper radial surface 18b by means of a radial portion extending inwards an upper end of the said skirt. A hook 18e directed inwards, which may be continuous or discontinuous circumferentially, is arranged on the bore of the outer axial skirt 18d in the vicinity of its lower end. The hook 18e is directed radially inwards in the direction of the supporting cap 20.

The rolling bearing 22, with its axis 16, comprises an upper ring 24 and a lower ring 26 between which is housed a row of rolling elements 28 in this instance made in the form of balls. A cage 30 is also provided to maintain an even circumferential spacing between the rolling elements 28. The rolling elements 28 are placed between raceways formed by the upper ring 24 and lower ring 26. Advantageously, these rings can be obtained from one and the same thin metal-sheet blank by cutting and swaging, because the outer diameter of the upper ring 24 is substantially equal to the inner diameter of the lower ring 26.

The upper ring 24 has a toroidal portion 24a in contact with a matching surface 18f of the solid portion 18a of the bearing cap 18. The toroidal portion 24a is extended inwards by a toroidal portion 24b of opposite concavity extending to the vicinity of a lower radial surface of the solid portion 18a from which the inner axial skirt 18c extends. The outer surface of the toroidal portion 24a exhibits in cross section a concave inner profile in a quarter of a circle and forms a toroidal raceway for the rolling elements 28.

The lower ring 26 also comprises a toroidal portion 26a the inner surface of which has in cross section a concave inner profile in a quarter of a circle and forms a toroidal raceway for the rolling elements 28. The toroidal portion 26a comes into contact against the supporting cap 20 and is extended outwards by a short radial portion. The cage 30 is situated radially between the toroidal portion 24b of the upper ring 24 and the toroidal portion 26a of the lower ring 26.

The supporting cap 20 comprises a body 32 and an insert 34 to reinforce the said body in order to increase the resistance of the cap to the loads originating from the forces exerted by the suspension spring 12.

The body 32 is made of synthetic material and comprises a portion 36 in the shape of a radial plate and an annular axial skirt 38 placed inside and extending axially away from the upper bearing cap 18. The skirt 38 comprises, at its lower end, a radial protrusion 40 directed outwards defining a groove 42 making it possible to retain a protective bellows (not shown) for the damper rod 14.

The portion 36 comprises a cylindrical outer surface 36a of small axial dimension from the lower end of which an annular frustoconical surface extends inwards which is extended inwards by an annular radial surface 36b delimiting a bearing surface for the top end turn of the suspension spring 12. A small-diameter edge of the radial surface 36b is extended inwards and downwards by a rounded surface and then by an outer axial surface 38a of the skirt 38 which allows the centring of the spring 12.

In the vicinity of the upper end of the axial outer surface 36a, the portion 36 of the body 32 comprises an axial annular rib 36c extending towards the bearing cap 18 while remaining at a distance. The outer surface of the rib 36c comprises a hook 37 directed radially outwards towards the supporting cap 20, which may be circumferentially continuous or discontinuous. The hook 37 has an outer diameter that is greater than the diameter of the hook 18e of the bearing cap 18 and is placed axially above the latter so as to be able to interfere diametrically with the said hook in case the supporting cap 20 and the bearing cap 18 begin to separate. The hook 37 therefore forms a means for the axial retention of the bearing cap 18 relative to the supporting cap 20 in order to prevent the elements forming the device 10 from coming apart before it is mounted in the MacPherson strut of the vehicle.

The rib 36c radially surrounds the lower ring 26 of the rolling bearing 22. The upper end of the rib 36c is extended inwards by a toroidal surface 36d in contact with the toroidal portion 26a of the lower ring 26 and of matching shape. The toroidal surface 36d is extended inwards by an annular frustoconical surface from which there extends inwards an annular radial surface 36e which is extended, at a small-diameter edge, by an annular axial surface 36f extending downwards. The lower end of the axial surface 36f is extended by a rounded surface 36g, itself extended axially downwards by an inner axial surface 38b forming the bore of the skirt 38.

The annular reinforcing insert 34 is made in a single piece by moulding of a rigid synthetic material. The reinforcing insert 34 comprises a cylindrical annular axial portion 34a which is extended, outwards from an upper end, by a rounded portion from which an annular radial portion 34b extends radially outwards. The axial portion 34a extends axially inside the skirt 38. The radial portion 34b extends radially into the portion 36. It is situated axially close to the radial surface 36b and extending radially beyond the said surface. The axial portion 34a and radial portion 34b are generally L-shaped in cross section. The reinforcing insert 34 is in this instance completely embedded into the body 32.

The reinforcing insert 34 makes it possible to stiffen the supporting cap 20 and to ensure a good transmission to the rolling bearing 22 of the axial and radial loads originating from the forces exerted by the suspension spring 12. For this purpose, the reinforcing insert 34 is made from a synthetic material that is more rigid than that used for the body 32 of the cap. The rigid synthetic material of the insert 34 may for example be a polyamide PA 6.6, a polyphthalamide PPA, a polyphenylene sulphone PPS, an acrylonitrile-butadiene-styrene ABS, etc. It may or may not be laden with glass or carbon fibres.

The body 32 of the supporting cap 20 is designed in a synthetic material that is more flexible than that used for the reinforcing insert 34, for example an unladen polyamide PA or an elastomeric material such as a polyurethane PU, a nitrile rubber NBR, a hydrogenated nitrile rubber HNBR, a thermoplastic polyurethane TPU, etc.

The supporting cap 20 comprises the body 32 made of flexible material and the reinforcing insert 34 made of rigid material in order to increase the rigidity of the cap and allow a good transmission of the forces between the suspension spring 12 and the rolling bearing 22. The shape and thickness of the insert 34 can be adapted for this purpose. It could, for example, be possible to locally increase the thickness of the insert as a function of the forces exerted by the suspension spring 12 that have to be absorbed and thus increase the mechanical strength of the supporting cap 20. The reinforcing insert 34 can therefore have a variable thickness in order to locally reinforce its mechanical strength. In a variant embodiment, it could be possible to provide the reinforcing insert 34 with no axial portion 34a.

Figure 2:
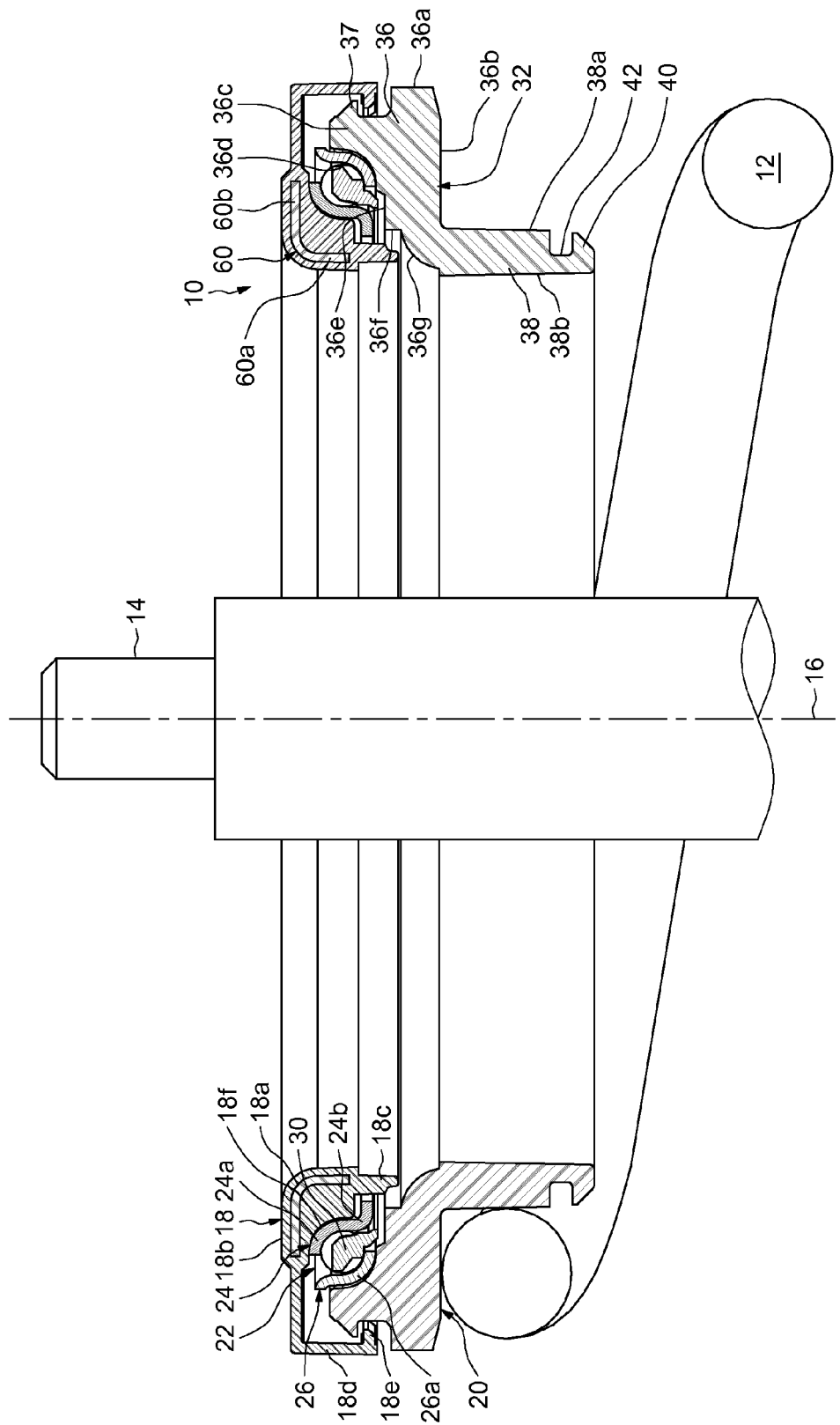

In the above embodiment, the supporting cap 20 comprises a reinforcing insert 34 to increase its mechanical strength against the forces exerted by the suspension spring 12. Alternatively, it is possible to provide a device 10 comprising a reinforcing insert associated with the upper bearing cap 18 as illustrated in FIG. 2 representing a second embodiment in which the elements that are similar bear the same reference numbers.

The bearing cap 18 comprises an annular reinforcing insert 60 made in a single piece by moulding of a rigid synthetic material such as a polyamide PA 6.6, a polyphthalamide PPA, a polyphenylene sulphone PPS, an acrylonitrile-butadiene-styrene ABS, etc. The synthetic material may or may not be laden with glass or carbon fibres. The reinforcing insert 60 is in this instance fully embedded into the body of the bearing cap 18. It comprises an axial portion 60a which is extended, outwards from an upper end, by a rounded portion from which a radial portion 60b extends radially outwards. The axial portion 60a and radial portion 60b are generally L-shaped in cross section. The axial portion 60a and radial portion 60b extend respectively axially and radially into the solid portion 18a of the body of the bearing cap 18. The axial portion 60a is situated axially in the extension of the inner axial skirt 18c. The axial portion 62 is therefore offset radially towards the inside of the device relative to the toroidal portion 24a of the upper ring 24. The radial portion 60b is situated axially between the upper radial surface 18b of the bearing cap 18 and the toroidal surface 18f of the said cap. The large-diameter outer edge of the radial portion 60b is slightly offset towards the outside relative to the upper ring 24. The body of the bearing cap 18 is overmoulded onto the reinforcing insert 60.

The reinforcing insert 60 makes it possible to stiffen the bearing cap 18 and to ensure a good transmission to the chassis of the axial and radial loads causing forces exerted by the suspension spring 12 and transmitted by the rolling bearing 22 with oblique contact. The body of the bearing cap 18 is made by moulding a synthetic material that is more flexible than that used for the reinforcing insert 34, for example an unladen polyamide PA or an elastomer material such as a polyurethane PU, a nitrile rubber NBR, a hydrogenated nitrile rubber HNBR, a thermoplastic polyurethane TPU, etc.

In both of the embodiments previously described, the suspension thrust bearing devices comprise a cap in which the mechanical strength against the forces exerted by the suspension spring is improved by virtue of the use of a reinforcing insert made of material that is more rigid than the body of the said cap and of which the shape and thickness may if necessary be adapted in the zones for absorbing forces.

Figure 3:
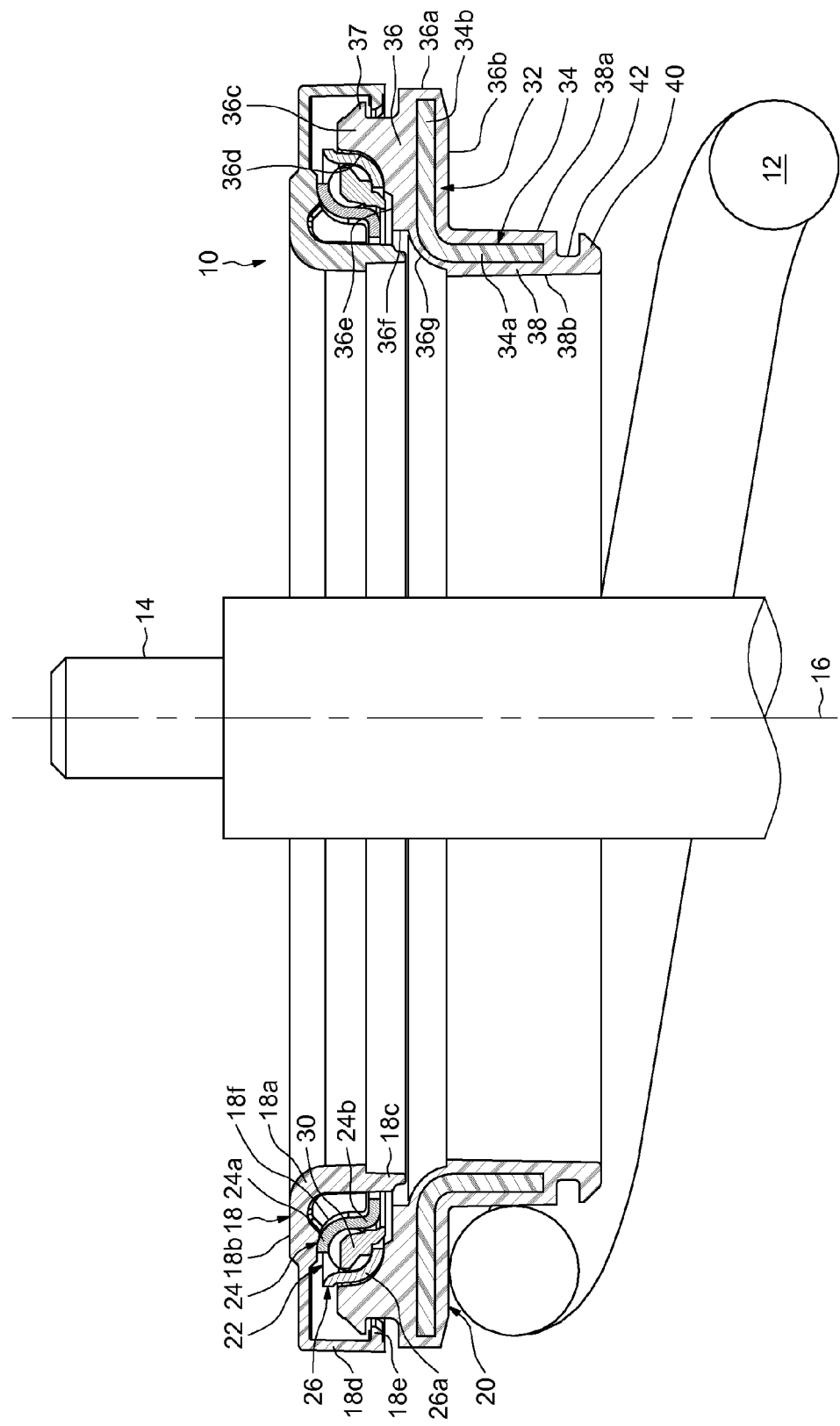
Figure 4:
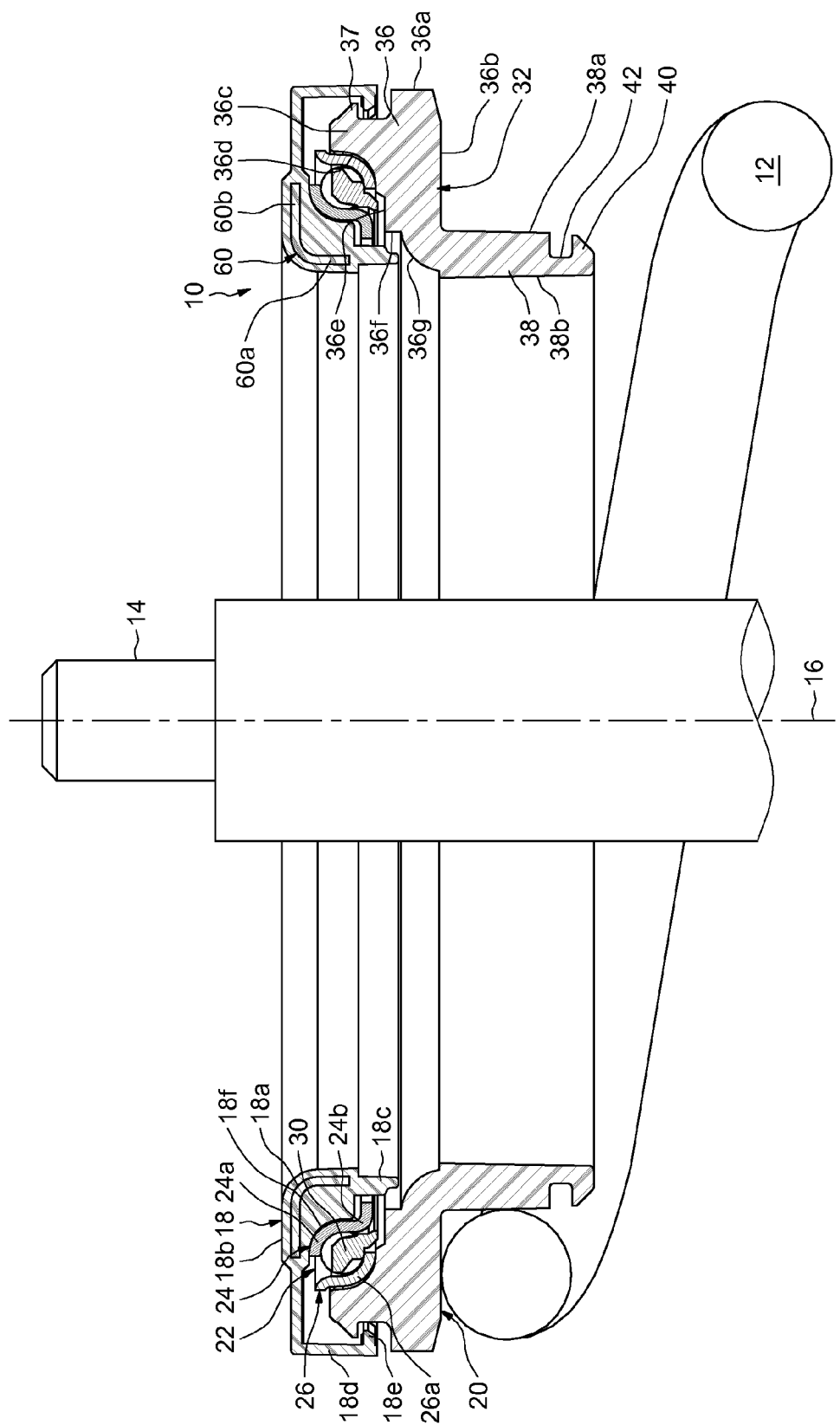

The embodiment illustrated in FIG. 3, respectively in FIG. 4, differs from the embodiment of FIG. 1, respectively of FIG. 2, only in that the insert 34 of the supporting cap 20, respectively the insert 60 of the bearing cap 18, is made of a synthetic material that is more flexible than that used for the body 32 of the supporting cap 20, respectively the body of the bearing cap 18. The inserts 34, 60 may for example be made of unladen polyamide PA or of an elastomeric material such as a polyurethane PU, a nitrile rubber NBR, a hydrogenated nitrile rubber HNBR, a thermoplastic polyurethane TPU, etc. The body of the supporting cap 20 and that of the bearing cap 18 may be made of polyamide PA 6.6, polyphthalamide PPA, polyphenylene sulphone PPS, acrylonitrile-butadiene-styrene ABS, etc.

In these embodiments, the rigid bodies of the caps make it possible to absorb the forces exerted by the suspension spring 12, the inserts 34 and 60 forming filler inserts made of a synthetic material costing less than those used for the said bodies in order to reduce the overall cost of the caps.

In this variant, it is possible to provide for the supporting cap 20 and/or bearing cap 18 stiffening ribs in order to reinforce the resistance to the forces exerted by the suspension spring 12, the insert then advantageously being able to comprise recesses of matching shape inside which the ribs extend. The recesses also make it possible to improve the coupling of the synthetic material forming the body of the caps which is overmoulded onto the insert. Specifically, during the overmoulding operation, the synthetic material that surrounds the whole of the insert penetrates the through recesses.

In the embodiments described, either the lower bearing cap or the upper supporting cap comprises an insert. However, it can be understood that it is also possible, without departing from the context of the present invention, to combine these arrangements by providing an insert for each of the caps, the lower bearing cap and the upper supporting cap. It would also be possible for the insert to be not wholly embedded into the body of the corresponding cap because it is made of synthetic material and is therefore not subject to corrosion. As a variant, the insert could have no axial portion and comprise only the radial portion and therefore have a flat shape.

The invention claimed is:

1. A suspension thrust bearing device for a motor vehicle having a rolling bearing, the rolling bearing forming a thrust bearing and comprising:
   an upper ring,
   a lower ring, and
   at least one row of rolling elements placed between the upper ring and the lower ring,
   a bearing cap in contact with the upper ring, the bearing cap comprising an outer annular skirt positioned radially outward from the at least one row of rolling elements, the outer annular skirt having a hook projecting radially inwardly therefrom, and
   a supporting cap in contact with the lower ring and forming a bearing means for a suspension spring, the supporting cap having a groove therein along a radial outer surface configured to receive the hook therein such that the bearing cap is configured to directly engage the supporting cap when axial separation therebetween reaches a predetermined distance providing axial retention of the bearing cap on the supporting cap, when the predetermined distance of axial separation is reached, a radial surface of the groove contacts and engages a radial surface of the hook, the radial surfaces of the groove and the hook being parallel to each other and parallel to a radial axis of the rolling bearing, and the outer annular skirt of the bearing cap and the radial outer surface of the supporting cap form a labyrinth seal when the predetermined distance is not reached, wherein at least one of the bearing cap and the supporting cap having a body formed of a first synthetic material and an insert at least partly covered by the body, the insert not contacting the upper ring nor the lower ring, other than the insert each of the bearing cap and the supporting cap are formed of a unitary material as a single piece, wherein the insert is formed of a second synthetic material different from the first synthetic material, wherein at least one of the first synthetic material and the second synthetic material is flexible, and wherein the supporting cap comprises an annular axial skirt extending axially away from the bearing cap, a lower end of the annular axial skirt having a radial protrusion defining a second groove configured to engage a protective bellows.

2. The device according to claim 1, wherein the second synthetic material of the insert is rigid and the first synthetic material of the body is more flexible.

3. The device according to claim 1, wherein the second synthetic material of the insert is flexible and the first synthetic material of the body is more rigid.

4. The device according to claim 1, wherein the insert is completely embedded into the body of the said cap.

5. The device according to claim 1, wherein the insert further comprises an annular radial portion.

6. The device according to claim 5, wherein the insert comprises an axial portion axially extending an inner edge of the radial portion.

7. The device according to claim 1, wherein the body of the said cap is overmoulded onto the insert.

* * * * *